United States Patent [19]

Richards et al.

[11] 4,008,154
[45] Feb. 15, 1977

[54] ROTARY FILTER WASH DISTRIBUTOR

[75] Inventors: John F. Richards, Baton Rouge, La.; Robert G. Tripp, Houston, Tex.

[73] Assignee: Exxon Research and Engineering Company, Linden, N.J.

[22] Filed: July 11, 1975

[21] Appl. No.: 595,236

Related U.S. Application Data

[63] Continuation of Ser. No. 456,157, March 29, 1974, abandoned.

[52] U.S. Cl. .............................. 210/217; 210/456; 239/145
[51] Int. Cl.² ........................................ B01D 33/06
[58] Field of Search ............... 210/66, 67, 77, 216, 210/217, 402, 404, 456; 239/145, 542, 547; 61/13

[56] References Cited

UNITED STATES PATENTS

| | | | |
|---|---|---|---|
| 3,215,277 | 11/1965 | Miles, Jr. | 210/217 |
| 3,302,408 | 2/1967 | Schmid | 61/13 |
| 3,777,987 | 12/1973 | Allport | 239/542 |

FOREIGN PATENTS OR APPLICATIONS

| | | | |
|---|---|---|---|
| 493,956 | 4/1938 | United Kingdom | 210/291 |

*Primary Examiner*—Charles N. Hart
*Assistant Examiner*—R. G. Mukai
*Attorney, Agent, or Firm*—H. N. Wells; F. Donald Paris

[57] ABSTRACT

A wash liquid distributor for a rotary drum filter which distributes liquid uniformly across the filter cake and provides very effective washing. The distributor apparatus in its preferred embodiment comprises an elongated hollow pipe, one or more being used in parallel operation, each pipe having a multiplicity of evenly spaced and axially aligned small holes. Each hole imposes a substantial pressure drop on the fluid passing therethrough and creates a uniform distribution of the wash liquid along the distributor pipe. To avoid damage to the filter cake from the jets of liquid produced, a diffusion channel is provided which damps the kinetic energy of the jets and subdivides the liquid entering the channel. Upon leaving the diffusion channel the liquid is collected and redistributed from drip points spaced at intervals which are generally narrower than those of the holes in the distributor pipe. In the preferred embodiment such drip points are provided by helical overwrap of wire which serves both to collect liquid leaving the diffusion channel and to redistribute it onto the filter cake. The three-step procedure of the distributor creates a multiplicity of narrow pools of liquid on the filter cake which provide efficient washing when drawn through the cake by vacuum inside the drum and avoiding channeling through the cake or blinding of its passages.

2 Claims, 3 Drawing Figures

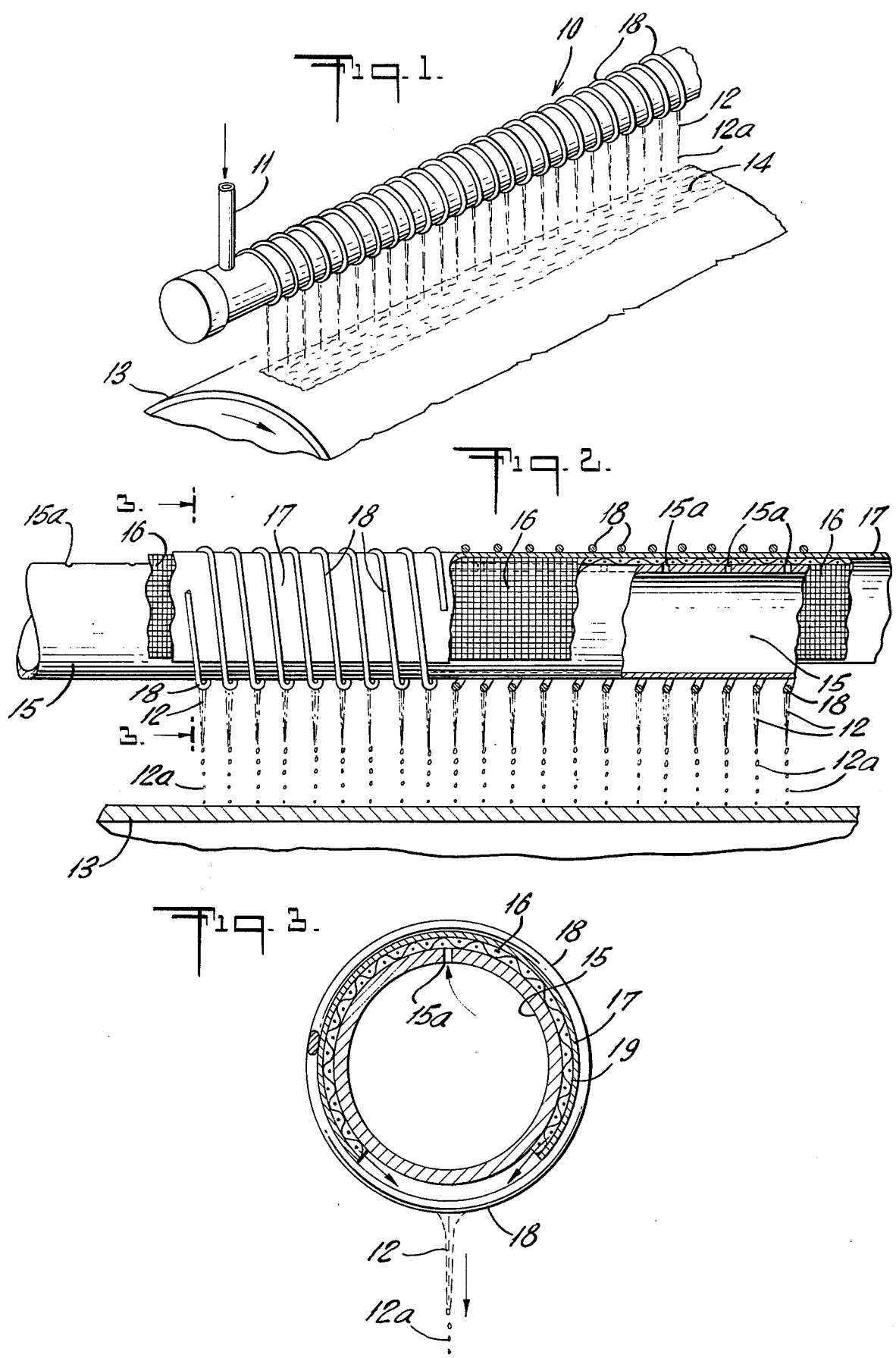

ROTARY FILTER WASH DISTRIBUTOR

This is a continuation, of application Ser. No. 456,157, filed Mar. 29, 1974, now abandoned.

BACKGROUND OF THE INVENTION

Rotary filters have been widely used in the chemical industries for many years. It is typical of such filters that the solid particles which are laid down on the filter drum must be washed in order to remove residual liquid remaining therein. It has been found extremely difficult to apply wash liquid satisfactorily and consequently, such efforts have been the subject of much prior art.

In U.S. Pat. No. 949,724 an early means of disposing of wash liquid on a filter cake is disclosed to be simply a trough suspended above a rotary filter drum with liquid overflowing a curved lip on one side of the trough. This simple technique would appear to be satisfactory, but in fact is found to be subject to substantial difficulties owing to the need for absolute leveling of such distribution troughs, especially when they are of substantial length. For example, a commercial filter drum may be 15 or 20 feet in length, so that only a slight deviation from the horizontal position would cause great disparity in wash rate from one end of the cake to another.

An improvement on the simple trough is illustrated by U.S. Pat. No. 1,059,327, wherein an overflow trough has been provided with V-shaped notches to create a weir-type distributor. Although the weir device will overcome some of the disadvantages of the overflow lip of the earlier patent, nevertheless it remains sensitive to the horizontal leveling of the trough.

For some purposes such trough systems may provide a satisfactory result. It may be inferred from the prior art, however, that improved distribution was required since more complex belt distributors were introduced. Such systems are typified by U.S. Pat. Nos. 1,475,244, 2,092,111, and 2,202,932. These devices have as their objective uniform distribution of wash liquid by passing it through a porous belt, whereby the liquid is spread out onto the cake to provide a thin film of liquid. At the same time, to assure uniformity in the wash rate, the cake was leveled by the belt. While such devices would seem to be satisfactory for some materials, if the cake is subject to blinding by scraping it, it is quite probable that a belt distributor would cause a reduction rather than an improvement in wash liquid distribution since the passages in the cake could be blocked by the rubbing action of the belt.

U.S. Pat. No. 2,698,687, shows a compartmented belt holding in its individual segments significant amounts of liquid, which presumably would be confined to the area of the cake directly beneath it.

U.S. Pat. No. 3,215,277 illustrates a more recent technique whereby capillary resistance is used to provide distribution between the two sets of openings in a distributor. Liquids issuing from the first set of openings is passed to the second set through a medium which provides significant resistance to its passage.

U.S. Pat. No. 3,729,414 illustrates a distribution system for a rotary filter in a process similar to that for which the present invention was developed. In that system, distribution pipes are fed with liquid from several entry points and the liquid flows outwardly through small holes in the pipes and runs down and around grooving and drips off the bottom of the pipe. In such a distributor only a very small pressure can be used since the liquid must flow around the pipe rather than jetting out of the small holes. Thus, since very little pressure can be applied to the distributor pipe in the invention, it is not possible to obtain optimum distribution along the pipe and distribution will be disturbed by changes in wash flow rates.

The process to which U.S. Pat. No. 3,729,414 was directed is a process for removal of wax crystals from lubricating oils. In that process, oil is dissolved in solvent and chilled to form wax crystals which are then removed by filtration. As will be appreciated, the wax crystals are soft and consequently the spaces between the crystals may be easily blinded by physical contact. As a result, belt distributor systems are unsatisfactory since they would have a tendency to blind the cake and thus create uneven distribution through it. If the wash liquid leaves the distributor pipes at a high velocity, it can impact against the cake with sufficient force to dislodge it or to cut channels in it and thereby prevent uniform washing.

Such filters can also be provided with spray nozzles mounted on distributor pipes. Since spray nozzles create relatively high velocity sprays, reasonably even distribution of liquid is possible at the outlet of the spray nozzles. However, the high velocities with which the spray issues have detrimental effects on the cake porosity and are undesirable. At the same time wash rates can vary widely depending on the nature of the wax crystals. When this occurs, the shape of the spray will change with the liquid pressure and coverage by the spray nozzles will be dependent upon the wash rate. Accordingly, at low wash rates poor coverage of the cake and poor washing often occurs.

The present invention has addressed itself to the problems which have been discussed. In the wax removal process which is described generally in U.S. Pat. Nos. 3,773,650 and 3,779,894 relatively high wash rates are possible. The crystals which are produced by this wax producing process are substantially spherical in nature and consequently the filter cake is more porous than in prior art processes and thus the filter cake can and should take a significantly higher wash rate. Thus, it has become even more important than heretofore to obtain a uniform distribution of wash without imparting high velocities to the wash liquid which could cause damage or blinding of the cake. The present invention has satisfactorily solved these problems and is disclosed in the detailed description which follows.

SUMMARY OF THE INVENTION

The wash distributor of the invention provides good distribution of wash liquid onto a filter cake at varying flow rates and permits proper adjustment of the wash rates to suit the feedstocks being processed. In addition, distribution occurs in the form of a multiplicity of continuous narrow pools of liquid which are laid down with a minimum disturbance of the porosity of the cake. Application of the wash liquid to the cake takes place in a three-step process. First, a uniform distribution of the wash liquid along the distributor pipe is provided by using a higher than usual pressure and creating a multiplicity of jets exiting from small holes axially spaced along the pipe and facing away from the filter cake. Thereafter, the kinetic energy of the jets is damped out in a diffusion channel adjacent to the jets and extending around the exterior of the pipe. Once the kinetic energy of the jets has been damped out and the liquid further diffused, it is collected and redistributed onto the filter cake from a series of drip points. In the preferred embodiment, the collecting and distributing function is provided by a helical wire overwrap. Liquid leaving the distribution wires falls as a series of thin streams which tend to break up into small droplets prior to contacting the filter cake. Upon contacting the filter cake pools of liquid are formed at the point of impact and then join to form a continuous uniform narrow pool of wash liquid extending completely across the filter cake, thereby creating a condition highly suitable for efficient washing. The improved washing characteristic of the present invention is shown in a wax removal process where the wax cake contains 20 to 30% lower residual oil content than when spray nozzles are used.

BRIEF DESCRIPTION OF THE DRAWINGS

FIG. 1 shows a perspective view of a single wash distributor of the present invention.

FIG. 2 is an enlarged view of a portion of the distributor of the invention.

FIG. 3 is a sectional view taken substantially along line 3—3 of FIG. 2.

DESCRIPTION OF THE PREFERRED EMBODIMENT

The ideal method of providing a wash liquid to a rotary vacuum filter cake would be to lay down, with essentially no impact, a uniform layer of wash liquid at a predetermined position on the filter cake. Following the first layer, additional layers should be deposited in sequence as required to effect the desired washing. Any disturbance of the surface of the filter cake is considered undesirable since it leads to cake blinding of the passageways between the particles and, in extreme cases, even dislodgment of the cake from the drum. It should be noted that a controlled amount of wash is required. While the disadvantages of insufficient washing are clear, that is, residual liquid remains behind in the filter cake, if excess wash liquid is used, greater than that which the filter cake can accept, the excess wash runs off the cake and into the bottom of the filter where it dilutes the feed. Thus, it is important to maintain the desired wash flow rate and to place the liquid only on the cake.

Reference to the prior art patents and in particular to U.S. Pat. No. 3,729,414 illustrate the general arrangement of a rotary vacuum filter. In the perspective view of FIG. 1, the mode of depositing the wash liquid by the present invention is illustrated. Liquid enters the distributor pipe 10 through inlet 11 under a pressure of at least 3 psig. It leaves the distributor 10 in the form of a carefully controlled series of streams 12 falling only under the pull of gravity and sufficiently finely divided so that the streams 12 tend to break up into fine droplets 12a prior to reaching the surface of the cake 13. After being deposited on the cake with minimum impact force, the droplets recombine to form pools of liquid which spread to join adjacent pools, resulting in the appearance illustrated in FIG. 1, that is, of a continuous narrow pool of liquid 14 deposited across the length of the filter cake 13. If a plurality of distributors is used, as would typically be the case, the cake would appear to be striped with the plurality of deposits of wash liquid. It is characteristic of the distributor that this appearance can be obtained over a wide variation of flow rates without any disturbance of the surface of the cake itself. A typical wash rate would be approximately 0.2 to 2.0 gallons per minute per linear foot of filter cake surface. For comparison it should be noted that U.S. Pat. No. 3,215,277 calls for a much narrower range of approximately 0.4 to 1.0 gallons per minute per linear foot of cake surface.

The distributor 10 comprises a pipe 15 with an overlay of diffusing material 16 covered by an outer solid wrap 17 to create a diffusion channel 19 between the inner pipe 15 and the outer wrap 17. The outer wrap 17, which would normally be of a sheet metal, but could be plastic or other material, does not extend fully around the pipe. It is secured to the pipe 15 beneath by means of a helical wire wrap 18 which has turns spaced approximately ½ inch apart, securing the overwrap 17 and at the same time collecting and redistributing liquid passing out of the diffusion channel 19 between the pipe 15 and the overwrap 17. Although the wire serves a dual purpose and is convenient, other means of securing the overwrap could be used, with collection and redistribution points being provided by some other means, for example, clamps having a grid for redistribution positioned between them. In a typical large commercial filter, the wire wrap has a diameter of approximately ⅛ inch.

FIG. 3 illustrates more clearly the function of a preferred embodiment of the invention. Wash liquid passes into the main distributor pipe 15 under pressure and then jets out at relatively high velocity through the uniformly spaced, axially aligned holes 15a. The large pressure drop assures better distribution of the liquid than if only a small pressure is used, as in the prior art. In a typical commercial application these holes may be of the order of 0.015 to 0.025 inches in diameter and require a differential pressure of at least 3 pounds per square inch to pass the desired flow rate. They are typically spaced 1 inch apart and directed away from the filter cake. It will be appreciated that if a pressure drop of about 15 pounds per square inch is taken across such a hole the result would be a substantial jet of liquid issuing from the hole and impinging on the filter casing from which it would splatter and not contact the filter cake properly for good washing. Of course, such jets directed in a downwardly direction toward the filter cake would tend to penetrate the cake and cut it so as to dislodge the cake or at the very least create a channeling effect which would cause the wash liquid to bypass the cake. To avoid both of these problems, the jets thus are turned away from the filter cake and the kinetic energy created by the distribution process is damped and the liquid is distributed through a diffusion channel 19 formed between the distributor pipe 15 and the overwrap 17. The spacing between the distributor pipe 15 and the overwrap 17 is about 1/16 inch, creating a narrow channel through which the liquid passes. The diffusion channel 19 performs its intended function by means of a relatively coarse wire screen 16 located between the distribution pipe 15 and the overwrap 17, so that the edge of the screen faces the flow of liquid. Although a wire screen 16 has been found to perform quite satisfactorily in commercial operation, other means of diffusing the liquid jets could of course be applied.

It would also be within the scope of the invention to utilize larger holes which would be less effective in distributing liquid and to replace the screen used in the diffusion channel with a device which would require a higher pressure drop and thus provide both a diffusing and a distributing function. Sintered metal, for example, might be chosen for this purpose.

It is typical that the overwrap 17 covers approximately 270° of the 360° available, leaving about 90° open at the bottom for collection and redistribution of the liquid. It will be appreciated that the liquid issuing from the diffusing channel 19 has little or no kinetic energy. Accordingly, its distribution onto the cake below would be of a random nature since it would collect at varying points along the outlet of the channel and drip off onto the cake below. In order to obtain a uniform distribution, the liquid moving at relatively low velocities must be collected and distributed in order to assure a uniform distribution on the cake below. Accorrdingly, the wire overwrap 18 is used which has been discussed previously. The function of the collecting wires 18 is to accept the liquid which leaves the diffusion channel 19 and to provide uniformly distributed drip points. In a typical commercial filter the distribution holes 15a are spaced approximately one inch apart, whereas the wire overwrap is spaced about ½ inch apart, which gives satisfactory redistribution. Some variation in the spacing would be possible without departing from the spirit of the invention. Low velocity liquid leaving the diffusion channel 19 is collected on the redistributing wires 18 until sufficient wash has been collected so that it runs off by the force of gravity. Typically, with the number of wires that are used, the stream is extremely small and while it runs off as a continuous stream 12, it fractures into multiple droplets 12a prior to reaching the filter cake which is ordinarily about 4–8 inches below. Thus, it will be seen that a minimum force is directed against the filter cake by these droplets. Since the filter cake cannot accept them instantly at the rate at which they are deposited on the cake, the droplets recombine to form a pool which then extends to join adjacent pools and the net effect achieved is the narrow pool which has been heretofore discussed and illustrated in FIG. 1.

The effectiveness of the distributor of the invention is clearly demonstrated by the results of the wax removal process where a 20–30% improvement in residual oil content was achieved compared to prior art spray nozzles.

The three-step distribution process which has been described is carried out successfully by the distributor illustrated and discussed herebefore. Some variation in the specific construction details are possible without exceeding the bounds of the invention which is defined by the scope of the claims which follow.

What is claimed is:

1. A wash liquid distributor for washing a cake deposited on a rotary drum filter comprising in combination: at least one elongated hollow distributor pipe mounted radially outward of and above said drum and parallel to the axis thereof such that liquid deposited by said pipe on said drum produces a continuous narrow pool of wash liquid on the cake, said pipe having a multiplicity of uniformly spaced axially aligned holes of about 0.015 to 0.025 inch diameter disposed on said pipe and providing communication between the interior of said pipe and a diffusion channel located externally of said pipe, said channel bounded by the exterior of said pipe and a solid cover partially surrounding said pipe and overlying said holes, said channel containing a coarse mesh screen positioned to present its edge to liquid passing through said channel whereby liquid jets produced by said holes are dampened and the liquid diffused throughout said channel, and overwrap means securing said cover to said pipe and collecting and redistributing said liquid exiting from said channel at a plurality of spaced drip points along said pipe, whereby a plurality of streams of liquid fall by gravity from said pipe onto said drum without damaging said cake.

2. A wash liquid distributor adapted for use with a rotary drum filter comprising:
   a. an elongated hollow distributor pipe;
   b. a multiplicity of uniformly spaced axially aligned holes disposed on said pipe providing liquid flow communication between the interior and exterior of said pipe and imposing a pressure drop on liquid passing therethrough which is sufficient to pass said liquid through said holes;
   c. diffusion channel means located between the exterior of said pipe and a solid cover partially surrounding said pipe and disposed over said axially aligned holes, said diffusion means including means for diffusing liquid flowing through said channel means thereby reducing the velocity of said liquid and comprising a fine pore sintered metal sheet wrapped substantially about said pipe overlying said holes; and
   d. overwrap means operably securing said solid cover to said pipe and for collecting and redistributing said liquid exiting from said channel substantially uniformly along said pipe.

* * * * *